United States Patent [19]

St. Clair et al.

[11] Patent Number: 5,854,314

[45] Date of Patent: Dec. 29, 1998

[54] CROSSLINKABLE WATERBORNE DISPERSIONS OF HYDROXY FUNCTIONAL POLYDIENE POLYMERS AND AMINO RESINS

[75] Inventors: David John St. Clair, Houston; James Robert Erickson, Katy, both of Tex.

[73] Assignee: Shell Oil Company, Houston, Tex.

[21] Appl. No.: 942,514

[22] Filed: Oct. 2, 1997

Related U.S. Application Data

[62] Division of Ser. No. 679,164, Jul. 12, 1996, Pat. No. 5,721,317, which is a continuation of Ser. No. 479,583, Jun. 7, 1995, abandoned, which is a continuation of Ser. No. 277,375, Jul. 18, 1994, abandoned.

[51] Int. Cl.$^6$ ............................... C08K 3/20; C08L 63/08
[52] U.S. Cl. ...................... 523/416; 523/319; 523/322; 525/332.9
[58] Field of Search ...................................... 523/319, 322, 523/416; 525/332.9

[56] References Cited

U.S. PATENT DOCUMENTS 5,242,989  9/1993  Bening et al. ........................... 525/384

FOREIGN PATENT DOCUMENTS 987432  3/1965  United Kingdom .

*Primary Examiner*—Melvyn I. Marquis
*Assistant Examiner*—D. Aylward
*Attorney, Agent, or Firm*—Donald F. Haas

[57] ABSTRACT

A crosslinkable waterborne dispersion of a hydroxy functional polydiene polymer composition which comprises: (a) 10 to 65% w of a hydroxy functional polydiene polymer, (b) 0.2 to 25% w of a compatible amino resin, (c) 0.1 to 10% w of a surfactant which is nonionic or anionic and has a volatile cation, and (d) the balance water. The invention also describes a water-continuous process and an inversion processes for making such dispersions.

11 Claims, No Drawings

CROSSLINKABLE WATERBORNE DISPERSIONS OF HYDROXY FUNCTIONAL POLYDIENE POLYMERS AND AMINO RESINS

This is a division of application Ser. No. 08/679,164, filed Jul. 12, 1996, now U.S. Pat. No. 5,721,317 which is a continuation of Ser. No. 08/479,583 filed Jun. 7, 1995, abandoned, which is a continuation of Ser. No. 08/277,375, filed Jul. 18, 1994 abandoned.

BACKGROUND OF THE INVENTION

This invention relates to waterborne dispersions of hydroxy functional polydiene polymers. More specifically, the invention relates to waterborne dispersions of such polymers and amino resins which can be crosslinked to make cured films, coatings, adhesives, sealants, caulks, binders and modifiers for asphalt.

Hydroxy functional polydiene polymers are well known. It has been shown that formulations containing these polymers, a melamine resin, and an acid catalyst can be cured by baking under normal bake conditions. If such formulations could be dispersed in water, the utility of these polymers would be greatly broadened. This would allow preparation of low viscosity, waterborne formulations having very low volatile organic compound (VOC) contents. By adding waterborne hydroxy functional polydiene polymer dispersions to other water-based products having compatible surfactant systems, these polymers could be used to modify other types of resins and this could be done without concern about phase separation due to incompatibility of the hydroxy functional polydiene polymers and solvent-based resins.

It is one object of the present invention to provide a crosslinkable waterborne dispersion of hydroxy functional polydiene polymers and amino resins. Another object of this invention is to provide a method for making such crosslinkable waterborne dispersions.

SUMMARY OF THE INVENTION

The present invention provides a water dispersion of a crosslinkable hydroxy functional polydiene polymer composition which comprises:

(a) 10 to 65% by weight (% w) of a hydroxy functional polydiene polymer,
(b) 0.2 to 25% w of a compatible amino resin,
(c) 0.1 to 10% w of a nonionic surfactant or an anionic surfactant having a volatile cation, and
(d) the balance water.

In a preferred embodiment of the present invention, the compatible amino resin is a butylated amino resin and the surfactant is an anionic surfactant composed of an amine salt of an acid which can be used to catalyze the crosslinking of the polymer and the amino resin such as paratoluene sulfonic acid or dodecylbenzene sulfonic acid.

This invention also describes processes for making such crosslinkable waterborne dispersions. One method involves making a hot aqueous solution of the surfactant, adding a mixture of a hydroxy functional polydiene polymer and a compatible amino resin to the hot aqueous solution, and then mixing the components under high shear conditions. The preferred method involves mixing together at a temperature of 25° to 90° C. with vigorous agitation a hydroxy functional polydiene polymer, an amino resin, and the desired surfactant, and then adding water to the mixture slowly over a period of at least 15 minutes.

DETAILED DESCRIPTION OF THE INVENTION

The hydroxy functional polydiene polymers of the present invention are monools, diols, and polyols of hydrogenated and unhydrogenated low molecular weight diene homopolymers and copolymers with more than one diene and/or a vinyl aromatic hydrocarbon. Such copolymers will usually be random copolymers or tapered block copolymers since it is difficult to make low molecular weight copolymers with a sharp division between blocks because the crossover reaction from one monomer to the other is usually slow compared to the progagation reaction. Suitable polymers include monools, diols, and polyols of low molecular weight polybutadiene and polyisoprene and their copolymers with styrene, either hydrogenated or unhydrogenated.

Hydrogenated polybutadiene diols are preferred for use herein because they are easily prepared, they have low glass transition temperature, and they have excellent weatherability. The diols, dihydroxylated polybutadienes, are synthesized by anionic polymerization of conjugated diene hydrocarbons with lithium initiators. Monools and polyols can also be synthesized in the same manner. This process is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical monolithium living polymer structures containing conjugated diene hydrocarbons are:

X—B—Li                X—$B_1$—$B_2$—Li
X—A—B—Li              X—A—$B_1$—$B_2$—Li
X—A—B—A—Li wherein B represents polymerized units of one or more conjugated diene hydrocarbons such as butadiene or isoprene, A represents polymerized units of one or more vinyl aromatic compounds such as styrene, and X is the residue of a monolithium initiator such as sec-butyllithium. B can also be a copolymer of a conjugated diene and a vinyl aromatic compound. $B_1$ and $B_2$ are formed of different dienes.

The anionic polymerization of the conjugated diene hydrocarbons is typically carried out in a hydrocarbon solvent containing a structure modifier such as diethylether or glyme (1,2-diethoxyethane) to obtain the desired amount of 1,4-addition. As described in Re. 27,145 which is incorporated by reference herein, the level of 1,2-addition of a butadiene polymer or copolymer can greatly affect elastomeric properties after hydrogenation. The 1,2-addition of 1,3-butadiene polymers having terminal functional groups significantly and surprisingly influences the viscosity of the polymers. A 1,2-addition of about 40% is achieved during polymerization at 50° C. with about 6% by volume of diethylether or about 1000 ppm of glyme in the polymerization solvent.

The present invention also contemplates linear unsaturated or hydrogenated isoprene polymers having one to two terminal hydroxy groups per molecule and also such polymers having additional hydroxy groups. Preferably, the isoprene polymers have greater than 80% 1,4-addition of the isoprene and hydrogenation of at least 90% of the polymerized isoprene. The polymers are preferably prepared by anionic polymerization in the absence of microstructure modifiers that increase 3,4-addition of the isoprene.

The hydroxy functional polydiene polymers may have molecular weights of from about 1,000 to about 3,000,000.

Lower molecular weights require excessive crosslinking whereas higher molecular weights cause very high viscosity, making processing very difficult. More preferably, the polymer is one having a molecular weight of from about 2,000 to about 1,000,000. Most preferably, the polymer is one having a molecular weight of from about 3,000 to about 200,000 because this offers the best balance between cost, ability to use the mildest curing conditions and achieving good processing behavior.

In general, when solution anionic techniques are used, conjugated diolefin polymers, polydienes, are prepared by contacting the monomer to be polymerized with an anionic polymerization initiator such as group IA metals, their alkyls, amides, silanolates, napthalides, biphenyls and anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include isoprene (2-methyl-1,3-butadiene),2-ethyl-1,3-butadiene,2-propyl-1,3-butadiene,2-butyl-1,3-butadiene, 2-pentyl-1,3-butadiene(2-amyl-1,3-butadiene),2-hexyl-1,3-butadiene,2-heptyl-1,3-butadiene, 2-octyl-1,3-butadiene,2-nonyl-1,3-butadiene,2-decyl-1,3-butadiene,2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3-decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Also included are 1,3-butadiene, piperylene, 4,5-diethyl-1,3-octadieneand the like. Di-substituted conjugated diolefins which may be used include 2,3-dialkyl-substituted conjugated diolefins such as 2,3-dimethyl-1,3-butadiene, 2,3-diethyl-1,3-pentadiene, 2,3-dimethyl-1,3-hexadiene, 2,3-diethyl-1,3-heptadiene,2,3-dimethyl-1,3-octadiene and the like and 2,3-fluoro-substituted conjugated diolefins such as 2,3-difluoro-1,3-butadiene, 2,3-difluoro-1,3-pentadiene, 2,3-difluoro-1,3-hexadiene, 2,3-difluoro-1,3-heptadiene, 2,3-fluoro-1,3-octadiene and the like. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

In general, any of the solvents known in the prior art to be useful in the preparation of such polymers may be used. Suitable solvents, then, including straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers in a hydrocarbon solvent at a temperature between 0° and 100° C. using an alkyl lithium initiator.

The termination of living anionic polymers to form functional end groups is described in U.S. Pat. Nos. 4,417,029, 4,518,753, and 4,753,991, which are herein incorporated by reference. Of particular interest for the present invention are terminal hydroxyl groups. A monool has one such terminal hydroxy group on only one end of the polymer. A diol has a hydroxy group on each end of the polymer. Polyols are such polymers which have more than two hydroxy groups. Such polymers may be linear polymers with internal hydroxy groups in addition to the terminal hydroxy groups or they may be radial or star polymers having multiple arms of polydiene radiating from a central core and having terminal hydroxy groups thereon.

Anionic polymerization is often terminated by addition of water to remove the lithium as lithium hydroxide (LiOH) or by addition of an alcohol (ROH) to remove the lithium as a lithium alkoxide (LiOR). For polymers having terminal functional groups, the living polymer chains are preferably terminated with hydroxyl, carboxyl, phenol, epoxy, or amine groups by reaction with ethylene oxide, carbon dioxide, a protected hydroxystyrene monomer, ethylene oxide plus epichlorohydrin, or the amine compounds listed in U.S. Pat. No. 4,791,174, respectively. The termination step can result in release of fine particles of lithium bases as described in U.S. Pat. No. 5,166,277 which is incorporated by reference herein. The lithium bases may interfere with hydrogenation of the polymer and preferably are removed.

Hydrogenation of at least 90%, preferably at least 95%, of the unsaturation in the low molecular weight hydroxy functional polydiene polymers is achieved with nickel catalysts as described in U.S. Pat. Nos. Re. 27,145 and 4,970,254 and U.S. patent application Ser. No. 07/785,715 which are incorporated by reference herein. The preferred nickel catalyst is a mixture of nickel 2-ethylhexanoate and triethylaluminum.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the suitable calibration standards are narrow molecular weight distribution polystyrene polymers. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, New York, 1979.
2. *Light Scattering From Polymer Solutions*, M. B. Huglin, ed., Academic Press, New York, New York, 1972.
3. W. K. Kai and A. J. Havlik, *Applied Optics*, 12, 541 (1973).
4. M. L. McConnell, *American Laboratory*, 63, May, 1978.

The crosslinking agents which are useful in the present invention are amino resins. For the purposes of this invention, an amino resin is a resin made by reaction of a material bearing NH groups with a carbonyl compound and an alcohol. The NH bearing material is commonly urea, melamine, benzoguanamine, glycoluril, cyclic ureas, thioureas, guanidines, urethanes, cyanamides, etc. The most common carbonyl component is formaldehyde and other carbonyl compounds include higher aldehydes and ketones. The most commonly used alcohols are methanol, ethanol, and butanol. Other alcohols include propanol, hexanol, etc. American Cyanamid (renamed CYTEC) sells a variety of these amino resins, as do other manufacturers. American Cyanamid's literature describes three classes or "types" of amino resins that they offer for sale.

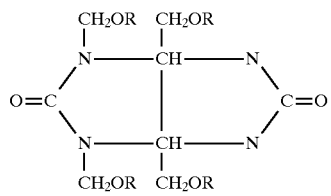

where Y is the material that bore the NH groups, the carbonyl source was formaldehyde and R is the alkyl group from the alcohol used for alkylation. Although this type of description depicts the amino resins as monomeric material of only one pure type, the commercial resins exist as mixtures of monomers, dimers, trimers, etc. and any given resin may have some character of the other types. Dimers, trimers, etc. also contain methylene or ether bridges. Generally, type 1 amino resins are preferred in the present invention.

The amino resin must be compatible with the hydroxy functional polydiene polymer. A compatible amino resin is defined as one which gives a phase stable blend with the polydiene polymer at the desired concentration and at the temperature to which the mixture will be heated when the dispersion in water is actually being made. We have found that it is best that the amino resin be butylated to a significant extent for proper compatibility with the polydiene polymers, i.e., the R groups must be butyl groups or at least primarily butyl groups.

For example, the following type 1 amino resins can be used to achieve the purpose of the present invention: CYMEL 1156—a melamine-formaldehyde resin where R is $C_4H_9$, CYMEL 1170—a glycoluril- formaldehyde resin where R is $C_4H_9$, CYMEL 1141—a carboxyl modified amino resin where R is a mixture of $CH_3$ and i-$C_4H_9$, and BEETLE 80—a urea-formaldehyde resin where R is $C_4H_9$. All of these products are made by American Cyanamid Company and are described in its publication 50 *Years of Amino Coating Resins*, edited and written by Albert J. Kirsch, published in 1986 along with other amino resins useful in the present invention.

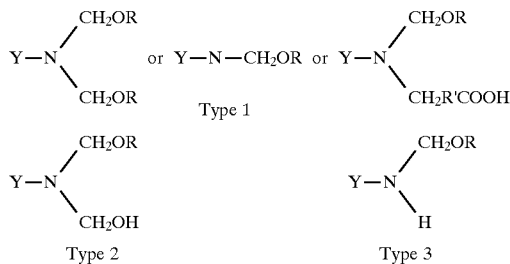

CYMEL 1170 is the following glycoluril-formaldehyde resin where R is $C_4H_9$: Another is BEETLE® 80 urea-formaldehyde resin where R is $C_4H_9$ whose ideal monomeric structure is depicted:

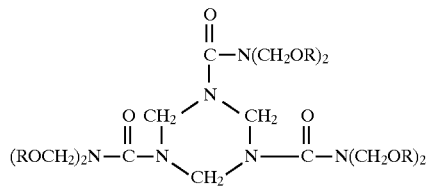

In the crosslinkable waterborne dispersion, the hydroxy functional polydiene polymer should comprise from 10 to 65% by weight (% w) of the total dispersion. The amino resin should be used in a ratio of 98:2 to 60:40 by weight with the polydiene polymer. Thus, the amino resin will comprise from 0.2 to 25% w of the dispersion. The dispersion will also require a surfactant, preferably an amine salt of an acid. The surfactant is used in an amount from 0.1 to 10% w.

If less than 10% w of the polymer is used, then the solids content of the dispersion will be uneconomically low and if more than 65% w is used, then the viscosity of the dispersion (if it can be made at all) will be too high. If less than 0.2% w of the amino resin is used, then the composition will not crosslink and if more than 25% w is used, then compatibility with the polydiene polymer will be poor and poor quality cured films will result. If less than 0.1 % w of the surfactant is used, then stable dispersions in water cannot be made and if more than 10% w of the surfactant is used, then cured films will have high moisture sensitivity. The balance of the dispersion is water.

Since the hydroxy functional polydiene polymer and its mixtures with melamine resin are hydrophobic and insoluble in water, a surfactant must be used to form a stable dispersion of the polymer and melamine in water. A wide variety of nonionic and anionic surfactants would be suitable. There are almost no restrictions on the type of nonionic surfactant which could be considered. The only restriction on the type of anionic surfactant is that the cation used to neutralize the acid on the hydrophobe must be volatile enough to leave the film during the melamine cure. Otherwise, a nonvolatile cation would neutralize the strong acid needed to catalyze the melamine curing reaction, thereby inhibiting cure. In fact, the preferred anionic surfactant is the one made by neutralizing the strong acid needed to catalyze the curing reaction with a volatile amine. The amine-neutralized acid serves as the surfactant stabilizing the dispersion and then, after the film is cast, the amine volatilizes, regenerating the acid which catalyzes the melamine cure.

Surfactants are molecules which have a hydrophobic portion (A) and a hydrophilic portion (B). They may have the structure A-B, A-B-A, B-A-B, etc. Typically, the hydrophobic section can be an alkyl group (e.g. $C_{12}$), an alkyl/aryl group (e.g. octylphenol), a polypropylene oxide block, a polydimethylsiloxane block or a fluorocarbon. The hydrophilic block of a nonionic surfactant is a water soluble block, typically a polyethylene oxide block or a hydroxylated polymer block. The hydrophilic block of an anionic surfactant is typically an acid group ionized with a base. Typical acid groups are carboxylic acids, sulfonic acids or phosphoric acids. Typical bases used to ionize the acids are NaOH, KOH, NH4OH and a variety of tertiary amines, such as triethyl amine, triisopropyl amine, dimethyl ethanol amine, methyl diethanol amine and the like. Nonvolatile bases such as NaOH and KOH should be avoided in this invention since they will neutralize the strong acid needed to catalyze the melamine curing reaction.

A proton-donating acid catalyst is required to achieve the purposes of the present invention, i.e., crosslink the polymer using the amino resins described above. It is normal that the amount of the acid catalyst used range from about 0.1 to about 4% w of the polymer/amine resin mixture to be certain there is sufficient acid but an excess can be undesirable. Most preferably, from about 0.5 to about 2% w of the polymer/amine resin is used. The presence of a strong proton-donating acid is normally required to catalyze the crosslinking reaction of many amino resins which are useful in the present invention. However, some medium strength and even relatively weak acids may also be effective depending upon the amino resins used. Generally, the most active catalyst are those with the lowest pKa values. The following list of acid catalysts which may be used in the present invention is arranged according to increasing pKa value: mineral acids, Cycat® 4040 catalyst (p-toluene sulfonic acid), Cycats® 500 catalyst (dinonylnaphthalene disulfonic acid), Cycat® 600 catalyst (dodecyl benzene sulfonic acid), oxalic acid, maleic acid, hexamic acid, phosphoric acid, Cycat® 296-9 catalyst (dimethyl acid pyrophosphate), phthalic acid and acrylic acid (copolymerized in polymer). Other acids which may be used are described in the aforementioned American Cyanamid Company publication. Also, 3M Brand Resin Catalyst FC-520 (diethylammonium salt of trifluoromethane sulfonic acid) may be used. Cycat® 600 was found to be a very useful catalyst.

It is highly preferred that the acid which is used in the surfactant be an acid which is capable of catalyzing the crosslinking of the polydiene polymer and the amino resins. Such acids are described above and include the various sulfonic acids described in the preceding paragraph. After the dispersion is applied to a substrate, usually after being formulated for a specific application such as a coating, adhesive or sealant, the volatile amine in the surfactant will evaporate into the atmosphere, freeing the acid to catalyze the curing reaction between the amino resin and the polydiene polymer. This is highly advantageous because it eliminates the cost of adding separate surfactant and acid catalyst components to the process for making these dispersions and also because it is a very simple and very effective approach to preparing dispersions in water. However, it is within the scope of this invention to use a nonionic or anionic surfactant to make the dispersion of polydiene polymer/amino resin which does not utilize the amine salt of the acid which can catalyze the curing reaction. In this case, of course, the acid catalyst would then have to be added to the dispersion.

The curing generally occurs within 5 seconds to 60 minutes, preferably 10 to 30 minutes, once the polydiene polymer and amino resin are exposed to the catalyst and usually high temperature. However, curing could occur at near ambient temperature over a period of up to 60 days such as for construction mastics, laminating adhesives and flexible packaging laminating adhesives.

The cure temperature generally ranges from −5° C. to 400° C. 100° to 300° C. is preferred and 100° to 200° C. is most preferred. In some applications, such as coil coating, curing is accomplished through heating to a maximum substrate surface temperature of up to 300° C. If this cure schedule is used, the time at this temperature is generally very short (on the order of 5 seconds) and cure continues as the surface cools.

Premature crosslinking is prevented by blocking the acid catalyst as an amine salt. The most preferred amine used in this work is triethylamine. Other blocking agents include triisopropylamine, dimethylethanolamine, methyldiethanolamine, diethylethanolamine, triethanolamine, diisopropanolamine, morpholine and 2-amino-2-methyl-1-propanol, water, primary, secondary and tertiary alcohols, as well as others described in the aforementioned American Cyanamid Company publication.

One method for making the dispersions of the present invention is the water-continuous process. In this process, a blend of the polydiene polymer and the amino resin is heated to reduce viscosity so it can be handled easily, usually to about 25° to about 80° C., is added to a hot water solution of the surfactant and dispersed preferably under high shear conditions. This process is easy to use because the viscosity is always low since water is always the continuous phase.

Dispersions according to the present invention can also be made by the inversion process. In this process, the polydiene polymer and the amino resin are mixed at about 25° to about 90° C. with, for example, a stirrer composed of two 4-blade propellers on a shaft rotating at about 500 to 5000 rpm. Water is added slowly over a period of at least 15 minutes. The mix is organic-continuous initially. As water is slowly added, the viscosity increases. The viscosity becomes very high as the inversion point is approached. As more water is added, the dispersion inverts from organic-continuous to water-continuous and the viscosity drops dramatically. This process is preferred over the water-continuous process because it usually gives a better, smaller particle size, more stable dispersion.

The present invention has many advantages. The main advantage is that the products can be applied at ambient temperatures as low viscosity liquids without the use of large quantities of solvents. Another advantage is that curing can be accomplished with relatively simple equipment and without additional formulation ingredients required for such crosslinking. The present invention also allows easy cure of coatings on irregularly-shaped objects. The waterborne dispersions can also be used as additives to other waterborne polymers having compatible surfactant systems to enhance specific properties such as toughness and flexibility.

The crosslinked materials of the present invention are useful in adhesives (including pressure sensitive adhesives, contact adhesives, laminating adhesives and assembly adhesives), sealants, coatings, films (such as those requiring heat and solvent resistance), printing plates, fibers, dipped goods (such as gloves), and as modifiers for polyesters, polyethers, polyamides and epoxies. In addition to the polydiene polymer and any curing aids or agents, products formulated to meet performance requirements for particular applications may include various combinations of ingredients including adhesion promoting or tackifying resins, plasticizers, fillers, solvents, stabilizers, etc.

Adhesive compositions of the present invention may be utilized as many different kinds of adhesives, for example, laminating adhesives, flexible packaging laminating adhesives, pressure sensitive adhesives and tie layers. The adhesive can consist of a formulated composition containing a significant portion of the polydiene polymer along with other known adhesive composition components.

One preferred use of the present formulation is the preparation of pressure-sensitive adhesive tapes and labels. Normally, the polymer dispersions of this invention will be mixed with a dispersion of a compatible tackifying resin prior to application to the backing. The pressure-sensitive adhesive tape comprises a flexible backing sheet and a layer of the adhesive composition of the instant invention coated on one side of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is near zero, the compositions of the present invention may be used for a sizing agent or saturant for paper, fabric or other fibers, as a rubbery article (such as a glove), for toughening asphalt, and the like.

Another preferred use of the present formulation is the preparation of coatings for substrates that can be baked at the temperatures described above. Such coatings are expected to be of particular importance for automotive and general metal finishes, especially coil coats. As will be seen in the following examples, coatings can be prepared with excellent color, clarity, hardness and adhesion. If substantially saturated polymers are used, the weatherability of the resulting films is expected to be excellent.

EXAMPLES

Two hydrogenated polybutadiene diol polymers having a primary hydroxyl functional group on each end were used to demonstrate this invention. Both were made by anionic polymerization. Polymer A has a GPC peak molecular weight (MW) of 2000 and the unhydrogenated polybutadiene diol precursor had 85% 1,2-butadiene addition. Polymer B has a MW of 4000 and the precursor had 40% 1,2 addition.

The acid used was CYCAT 600, dodecyl benzene sulfonic acid (a 70 % weight solution in isopropyl alcohol). Diethanol amine (DEA), triethylamine (TEA), or ammonia was used to neutralize the acid. Three melamine resins were tested in the formulation, a fully methylated melamine (CYMEL 303), a fully butylated glycoluril-formaldehyde (CYMEL 1170), and an acid functional, methylated/butylated melamine (CYMEL 1141). A silicone antifoam (BYK-034) was used in formulations where foaming was a problem.

Example 1

To minimize the partial incompatibility of Polymers A and B with the amino resin CYMEL 1141, the polymer and melamine were partially reacted prior to dispersing them in water. Enough reaction must be accomplished that the polymer and CYMEL 1141 are compatible during cure but too much reaction will cause the mix to be high in viscosity, making inversion to the water dispersion difficult. The following procedure was satisfactory.

In this procedure, 80 parts by weight (pbw) polymer, 20 pbw CYMEL 1141, and 18 pbw BUTYL OXITOL from Shell Chemical used to improve the film-forming capability of the dispersion upon drying, were heated to 80° C. in a resin kettle. While stirring, 0.4 pbw CYCAT 600 diluted with 2 pbw BUTYL OXITOL was added and the mixture was cooked for 2 hours. The surfactant was prepared by mixing 1.6 pbw CYCAT 600 and 2 pbw TEA in a bottle with 5 pbw water. This surfactant was added to the partially reacted polymer/CYMEL 1141 at 70° C. while stirring at 2,000 rpm with a stirrer having dual 4-bladed propellers. Blowing ambient temperature air on the can helped control the temperature rise due to viscous heating. Deionized water was then slowly added. Since some of the volatile TEA was lost during the dispersion, 2% by weight TEA was in the water being added to the mix in order to maintain a pH of at least 9. If the water is added too quickly (in less than about 5 minutes), a dispersion is obtained which creams upon standing overnight (probably because the particle size is too large). However, if the water is added over about a 15 to 30 minute period, a very nice stable dispersion is obtained.

The dispersions made with both Polymers A and B were low viscosity, milky white dispersions which remained stable upon storage for at least several weeks. The dispersion based on Polymer A developed a small amount of coagulum upon storage. The dispersion based on Polymer B did not show any coagulation or phase separation. When the dispersions were cast on aluminum and baked for 20 minutes at 175° C., both polymers A and B gave clear, glossy, colorless, peelable, elastomeric coatings. Although they were not tacky, they had the high coefficient of friction characteristic of rubbery films.

Example 2

Composition #1 in the table is a dispersion of Polymer A in water using the acid, neutralized with diethanol amine (DEA), as the surfactant. To make this dispersion, 2 grams of CYCAT 600 was added to 100 grams of deionized water. This was heated to 60° C. and 2.55 grams DEA was added (giving a pH of about 9). 100 grams of Polymer A, preheated to 80° C. to reduce its viscosity, was then poured into the soapy water while shearing the blend using a Silverson mixer-emulsifier rotating at about 8000 rpm. Since it foamed badly, 0.1 gram of BYK 034 antifoam was added to reduce foaming. This dispersion, made by the water-continuous process without an amino resin, was a fairly thick, creamy, white dispersion. After one month storage at ambient temperature, it showed some creaming but no coagulation.

Composition #2 in the table is a dispersion of 80% w Polymer A with 20% w CYMEL 1170 using CYCAT 600 neutralized with ammonia as the surfactant. Polymer A and CYMEL 1170 were mixed manually at about 80° C. before being added to the soapy water. The dispersion was made with the Silverson mixer/emulsifier using the same procedure as with Composition #1. Composition #2 also was a thick, creamy, white dispersion which showed little change upon storage at ambient temperature for one month. An attempt to make Composition #2 using CYMEL 303 instead of CYMEL 1170 was unsuccessful because the blend of Polymer A with CYMEL 303 was incompatible and phase separated before being added to the soapy water.

| Water Dispersions Made With Polymer A | | |
|---|---|---|
| Composition, % w | 1 | 2 |
| Polymer A | 100 | 80 |
| CYMEL 1170 | | 20 |
| CYCAT 600 | 2 | 2 |
| DIETHANOL AMINE | 2.55 | |
| AMMONIA | | 2 |
| BYK 034 | 0.1 | 0.1 |
| Water | 100 | 100 |

Example 3

Composition #2 of Example 2 was also dispersed using the inversion process. Eighty grams of Polymer A and 20 grams of CYMEL 1170 were mixed in a pint can on a hot plate at 60° C. While stirring with two 4-bladed propellers on a shaft rotating at about 2000 rpm, a blend of 2 grams CYCAT 600, 2 grams ammonia, 0.1 gram BYK 034 and 5 grams water was added. Water, containing 1% w ammonia, was then added slowly over about a 30 minute period, to make the dispersion by the inversion process. This gave an excellent dispersion. It was a low viscosity, white dispersion which showed no creaming or coagulation after storage at ambient temperature for one month.

We claim:

1. A process for making a stable water dispersion of a crosslinked hydroxy functional polydiene polymer composition which comprises:
    a) making a mixture of a surfactant which is nonionic or anionic having a volatile cation and water,
    b) adding a mixture of a hydroxy functional polydiene polymer and a compatible amino resin to the surfactant/water mixture,
    c) dispersing the polymer/resin mixture in the surfactant/water mixture by mixing with a high shear mixer/emulsifier in the absence of an organic solvent, and
    d) crosslinking the hydroxy functional polydiene polymer and the amino resin by adding a proton-donating acid catalyst and heating to a temperature of 100° to 300° C.

2. The process of claim 1 wherein the polymer and amino resin are partially prereacted before being added to the surfactant/water mixture.

3. The process of claim 1 wherein the amino resin is a butylated amino resin.

4. The process of claim 1 wherein the surfactant is an amine salt of an organic acid.

5. The process of claim 4 wherein the acid is an acid which can be used to catalyze the crosslinking of the polymer and the amino resin.

6. The process of claim 4 wherein the amine is a tertiary amine selected from the group consisting of triethylamine, triisopropylamine, methyldiethanolamine, and dimethylethanolamine.

7. A process for making a stable water dispersion of a crosslinked hydroxy functional polydiene polymer composition which comprises:
    a) mixing together at a temperature of 25° to 90° C. a hydroxy functional polydiene polymer, a compatible amino resin, and a surfactant which is an amine salt of an organic acid,
    b) adding water to the mixture over a period of at least 15 minutes while maintaining the mixture under vigorous agitation in the absence of an organic solvent, and
    c) crosslinking the hydroxy functional polydiene polymer and the amino resin by adding a proton-donating acid catalyst and heating to a temperature of 100° to 300° C.

8. The process of claim 7 wherein the polymer and amino resin are partially reacted together before mixing them with the surfactant in step a).

9. The process of claim 7 wherein the amino resin is a butylated amino resin.

10. The process of claim 7 wherein the acid is an acid which can be used to catalyze the crosslinking of the polymer and the amino resin.

11. The process of claim 7 wherein the amine is a tertiary amine selected from the group consisting of triethylamine, triisopropylamine, methyldiethanolamine, and dimethylethanolamine.

* * * * *